United States Patent
Ghosh et al.

(10) Patent No.: US 11,922,138 B2
(45) Date of Patent: Mar. 5, 2024

(54) METHOD AND SYSTEM FOR MODEL DRIVEN DATA MESH

(71) Applicant: JPMorgan Chase Bank, N.A., New York, NY (US)

(72) Inventors: Deepak Ghosh, Bangalore (IN); Srikanth Jagrothu, Hyderabad (IN); Ian Mark Miller, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 105 days.

(21) Appl. No.: 17/804,216

(22) Filed: May 26, 2022

(65) Prior Publication Data

US 2023/0325153 A1     Oct. 12, 2023

(30) Foreign Application Priority Data

Apr. 12, 2022     (IN) .............................. 202211021940

(51) Int. Cl.
*G06F 8/30* (2018.01)
*G06F 8/65* (2018.01)

(52) U.S. Cl.
CPC . *G06F 8/30* (2013.01); *G06F 8/65* (2013.01)

(58) Field of Classification Search
CPC .................................. G06F 8/30; G06F 8/65
USPC ........................................................ 717/106
See application file for complete search history.

(56) References Cited

U.S. PATENT DOCUMENTS 10,956,242 B1 * 3/2021 Kumar ...................... G06F 8/76
2022/0398186 A1 * 12/2022 Mudumba ............ G06F 16/254

FOREIGN PATENT DOCUMENTS

WO     WO-2006034350 A1 *  3/2006  ............... G06F 8/34

OTHER PUBLICATIONS

Priebe, Torsten, et al., Finding Your Way Through the Jungle of Big Data Architectures, IEEE International Conference on Big Data (Big Data), 2021, 3 pages, [retrieved on Oct. 28, 2023], Retrieved from the Internet: <URL:http://ieeexplore.ieee.org/>.*
Machado, Inês Araújo, et al., Data Mesh: Concepts and Principles of a Paradigm Shift in Data Architectures, Procedia Computer Science 196, 2022, pp. 263-271, [retrieved on Oct. 28, 2023], Retrieved from the Internet: <URL:http://www.sciencedirect.com>.*

* cited by examiner

*Primary Examiner* — Geoffrey R St Leger
(74) *Attorney, Agent, or Firm* — Greenblum & Bernstein, P.L.C.

(57) ABSTRACT

A method for providing a federated, multi-product data mesh via automated code generation is disclosed. The method includes receiving, via an application programming interface, a data model, the data model including model artifacts that define data governance for a data product; automatically generating source code for software components based on the data model, the software components corresponding to data mesh components for the data product; integrating data product customizations into the software components, the data product customizations including business logics and testing configurations; initiating an automated continuous integration and continuous delivery pipeline to generate a service that corresponds to the data product based on the integrated software components; and deploying the generated service in a namespace that corresponds to the data product.

20 Claims, 6 Drawing Sheets

METHOD AND SYSTEM FOR MODEL DRIVEN DATA MESH

CROSS-REFERENCE TO RELATED APPLICATIONS

This application claims the benefit of Indian Provisional Patent Application No. 202211021940, filed Apr. 12, 2022, which is hereby incorporated by reference in its entirety.

BACKGROUND

1. Field of the Disclosure

This technology generally relates to methods and systems for implementing a data mesh, and more particularly to methods and systems for providing a federated, multi-product data mesh via automated source code generation based on governed and defined data models.

2. Background Information

Many business entities operate vast enterprise networks of numerous software products that generate large amounts of useful data. Often, the large amounts of data must be ingested, cleansed, stored, and distributed to other software systems in the enterprise network before the data may be usable to make critical operational decisions, audit decisions, and control decisions. Historically, conventional techniques for managing the large amounts of data by using centrally managed, monolithic data lakes have resulted in varying degrees of success with respect to ensuring that the data is trustworthy as well as easily available for discovery, distribution, and consumption.

One drawback of using the centrally managed, monolithic data lakes is that in many instances, numerous complexities are associated with implementing the centralized architecture of the data lakes. As such, implementation of the centralized architecture results in a long and drawn-out building process. Additionally, difficulties relating to data governance, system scalability, ease of use, and adaptation to a changing data landscape such as, for example, the addition of new data domains may persist even after implementation of the centralized architecture due to the numerous complexities.

Therefore, there is a need to provide an ecosystem of distributed software components that builds, deploys, and runs a federated multi-product data mesh via an automated code generation process based on governed and defined data models.

SUMMARY

The present disclosure, through one or more of its various aspects, embodiments, and/or specific features or sub-components, provides, inter alia, various systems, servers, devices, methods, media, programs, and platforms for providing a federated, multi-product data mesh via automated source code generation based on governed and defined data models.

According to an aspect of the present disclosure, a method for providing a federated, multi-product data mesh via automated code generation is disclosed. The method is implemented by at least one processor. The method may include receiving, via an application programming interface, at least one data model, the at least one data model may include at least one model artifact that defines data governance for at least one data product; automatically generating source code for at least one software component based on the at least one data model, the at least one software component may correspond to a data mesh component for the at least one data product; integrating at least one data product customization into the at least one software component, the at least one data product customization may include at least one from among a business logic and a testing configuration; initiating an automated continuous integration and continuous delivery (CI/CD) pipeline to generate a service that corresponds to the at least one data product based on the integrated at least one software component; and deploying the generated service in a namespace that corresponds to the at least one data product.

In accordance with an exemplary embodiment, the method may further include identifying at least one predetermined guideline for data governance validation that relates to the at least one data model; and validating the at least one data model based on the at least one predetermined guideline.

In accordance with an exemplary embodiment, the data mesh component may correspond to a required component to build and execute at least one data mesh, the data mesh component may include at least one from among a naming service component, a data source component, a data infrastructure component, and a domain-oriented data pipeline component that is managed by functional owners.

In accordance with an exemplary embodiment, the naming service component may enable gathering of resource information that corresponds to the at least one data product, the gathered resource information may enable consumption-based billing for a corresponding resource.

In accordance with an exemplary embodiment, the resource information may include at least one from among resource type information, resource deployment information, resource configuration information, and resource consumption information.

In accordance with an exemplary embodiment, prior to integrating the at least one data product customization, the method may further include exposing, via a development platform, the automatically generated at least one software component to at least one developer; and receiving, via the development platform, the at least one data product customization from the at least one developer.

In accordance with an exemplary embodiment, to generate the service via the automated continuous integration and continuous delivery (CI/CD) pipeline, the method may further include building, via the automated CI/CD pipeline, the service based on the integrated at least one software component, the integrated at least one software component may include the source code for the at least one software component and the at least one data product customization; validating, via the automated CI/CD pipeline, the built service by using at least one test; and containerizing, via the automated CI/CD pipeline, the built service based on a result of the validation.

In accordance with an exemplary embodiment, the data governance may be defined for the at least one data product according to a centrally governed data contract, the centrally governed data contract may enable trusted publishing of data for the at least one data product.

In accordance with an exemplary embodiment, the automatically generated at least one software component may include a standardized mechanism to query resource metadata information across a plurality of data products.

According to an aspect of the present disclosure, a computing device configured to implement an execution of a method for providing a federated, multi-product data mesh via automated code generation is disclosed. The computing device including a processor; a memory; and a communication interface coupled to each of the processor and the memory, wherein the processor may be configured to receive, via an application programming interface, at least one data model, the at least one data model may include at least one model artifact that defines data governance for at least one data product; automatically generate source code for at least one software component based on the at least one data model, the at least one software component may correspond to a data mesh component for the at least one data product; integrate at least one data product customization into the at least one software component, the at least one data product customization may include at least one from among a business logic and a testing configuration; initiate an automated continuous integration and continuous delivery (CI/CD) pipeline to generate a service that corresponds to the at least one data product based on the integrated at least one software component; and deploy the generated service in a namespace that corresponds to the at least one data product.

In accordance with an exemplary embodiment, the processor may be further configured to identify at least one predetermined guideline for data governance validation that relates to the at least one data model; and validate the at least one data model based on the at least one predetermined guideline.

In accordance with an exemplary embodiment, the data mesh component may correspond to a required component to build and execute at least one data mesh, the data mesh component may include at least one from among a naming service component, a data source component, a data infrastructure component, and a domain-oriented data pipeline component that is managed by functional owners.

In accordance with an exemplary embodiment, the naming service component may enable gathering of resource information that corresponds to the at least one data product, the gathered resource information may enable consumption-based billing for a corresponding resource.

In accordance with an exemplary embodiment, the resource information may include at least one from among resource type information, resource deployment information, resource configuration information, and resource consumption information.

In accordance with an exemplary embodiment, prior to integrating the at least one data product customization, the processor may be further configured to expose, via a development platform, the automatically generated at least one software component to at least one developer; and receive, via the development platform, the at least one data product customization from the at least one developer.

In accordance with an exemplary embodiment, to generate the service via the automated continuous integration and continuous delivery (CI/CD) pipeline, the processor may be further configured to build, via the automated CI/CD pipeline, the service based on the integrated at least one software component, the integrated at least one software component may include the source code for the at least one software component and the at least one data product customization; validate, via the automated CI/CD pipeline, the built service by using at least one test; and containerize, via the automated CI/CD pipeline, the built service based on a result of the validation.

In accordance with an exemplary embodiment, the processor may be further configured to define the data governance for the at least one data product according to a centrally governed data contract, the centrally governed data contract may enable trusted publishing of data for the at least one data product.

In accordance with an exemplary embodiment, the automatically generated at least one software component may include a standardized mechanism to query resource metadata information across a plurality of data products.

According to an aspect of the present disclosure, a non-transitory computer readable storage medium storing instructions for providing a federated, multi-product data mesh via automated code generation is disclosed. The storage medium including executable code which, when executed by a processor, may cause the processor to receive, via an application programming interface, at least one data model, the at least one data model may include at least one model artifact that defines data governance for at least one data product; automatically generate source code for at least one software component based on the at least one data model, the at least one software component may correspond to a data mesh component for the at least one data product; integrate at least one data product customization into the at least one software component, the at least one data product customization may include at least one from among a business logic and a testing configuration; initiate an automated continuous integration and continuous delivery pipeline to generate a service that corresponds to the at least one data product based on the integrated at least one software component; and deploy the generated service in a namespace that corresponds to the at least one data product.

In accordance with an exemplary embodiment, the data mesh component may correspond to a required component to build and execute at least one data mesh, the data mesh component may include at least one from among a naming service component, a data source component, a data infrastructure component, and a domain-oriented data pipeline component that is managed by functional owners.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
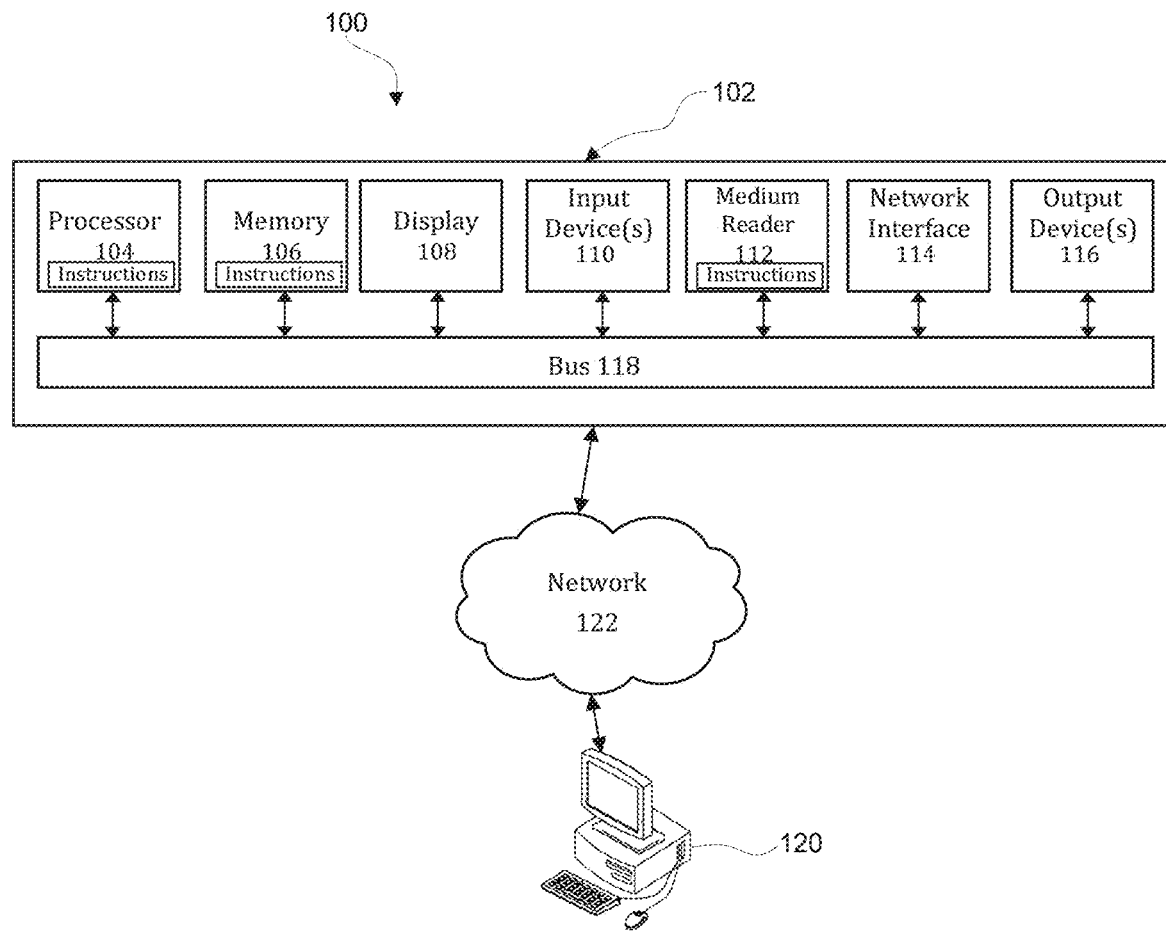
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing a federated, multi-product data mesh via automated source code generation based on governed and defined data models.

Figure 2:
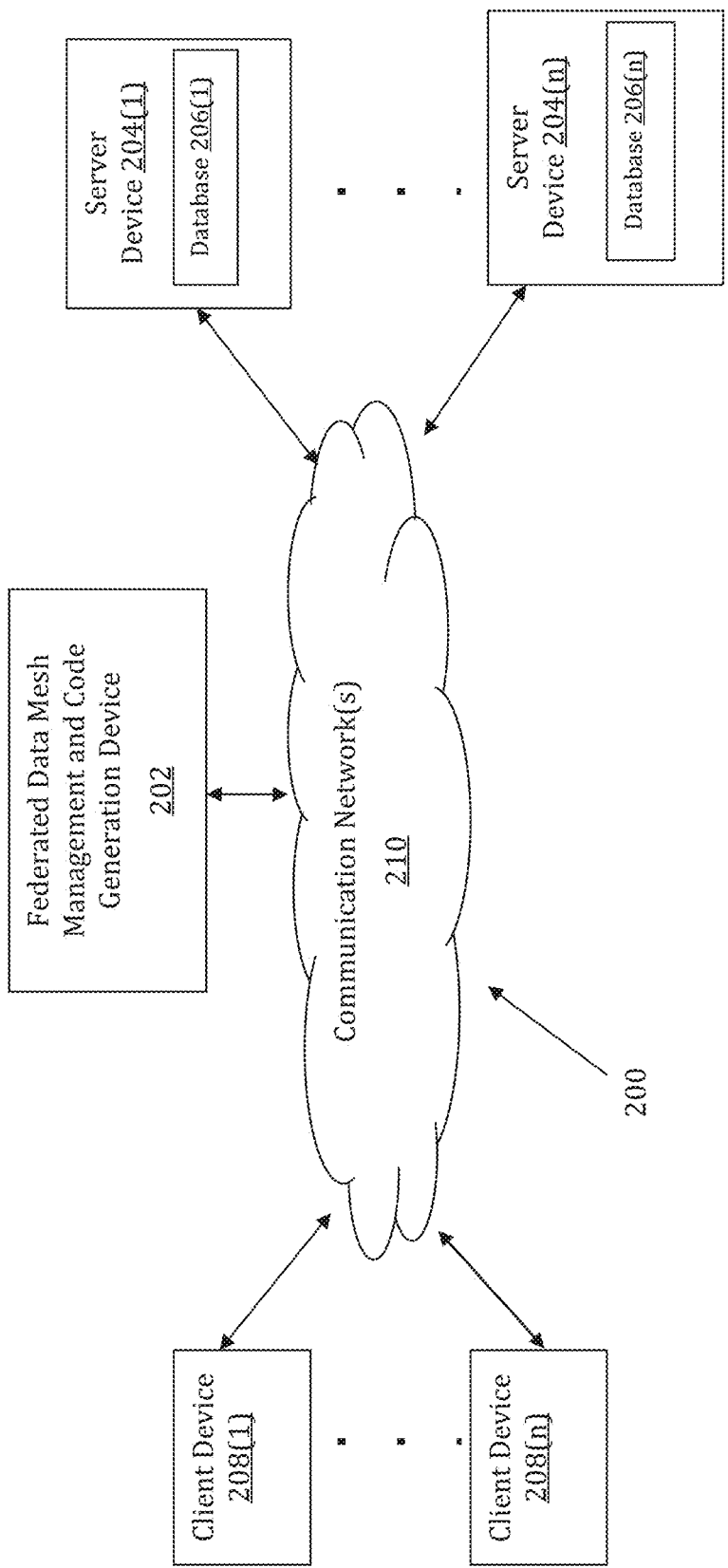
FIG. 2 illustrates an exemplary diagram of a network environment.

Referring to FIG. 2, a schematic of an exemplary network environment 200 for implementing a method for providing a federated, multi-product data mesh via automated source code generation based on governed and defined data models is illustrated. In an exemplary embodiment, the method is executable on any networked computer platform, such as, for example, a personal computer (PC).

The method for providing a federated, multi-product data mesh via automated source code generation based on governed and defined data models may be implemented by a Federated Data Mesh Management and Code Generation (FDMMCG) device 202. The FDMMCG device 202 may be the same or similar to the computer system 102 as described with respect to FIG. 1. The FDMMCG device 202 may store one or more applications that can include executable instructions that, when executed by the FDMMCG device 202, cause the FDMMCG device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the FDMMCG device 202 itself, may be located in virtual server(s) running in a cloud-based computing environment rather than being tied to one or more specific physical network computing devices. Also, the application(s) may be running in one or more virtual machines (VMs) executing on the FDMMCG device 202. Additionally, in one or more embodiments of this technology, virtual machine(s) running on the FDMMCG device 202 may be managed or supervised by a hypervisor.

In the network environment 200 of FIG. 2, the FDMMCG device 202 is coupled to a plurality of server devices 204(1)-204(n) that hosts a plurality of databases 206(1)-206(n), and also to a plurality of client devices 208(1)-208(n) via communication network(s) 210. A communication interface of the FDMMCG device 202, such as the network interface 114 of the computer system 102 of FIG. 1, operatively couples and communicates between the FDMMCG device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG.

1, although the FDMMCG device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and FDMMCG devices that efficiently implement a method for providing a federated, multi-product data mesh via automated source code generation based on governed and defined data models.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The FDMMCG device 202 may be a standalone device or integrated with one or more other devices or apparatuses, such as one or more of the server devices 204(1)-204(n), for example. In one particular example, the FDMMCG device 202 may include or be hosted by one of the server devices 204(1)-204(n), and other arrangements are also possible. Moreover, one or more of the devices of the FDMMCG device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the FDMMCG device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to data meshes, data models, model artifacts, data products, source codes, software components, data mesh components, data product customization, business logics, testing configurations, services, and name spaces.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the FDMMCG device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the FDMMCG device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the FDMMCG device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the FDMMCG device 202, the server devices 204(1)-204(n), or the client devices 208(1)-208(n), for example, may be configured to operate as virtual instances on the same physical machine. In other words, one or more of the FDMMCG device 202, the server devices 204(1)-204(n), or the client devices 208(1)-208(n) may operate on the same physical device rather than as separate devices communicating through communication network(s) 210. Additionally, there may be more or fewer FDMMCG devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
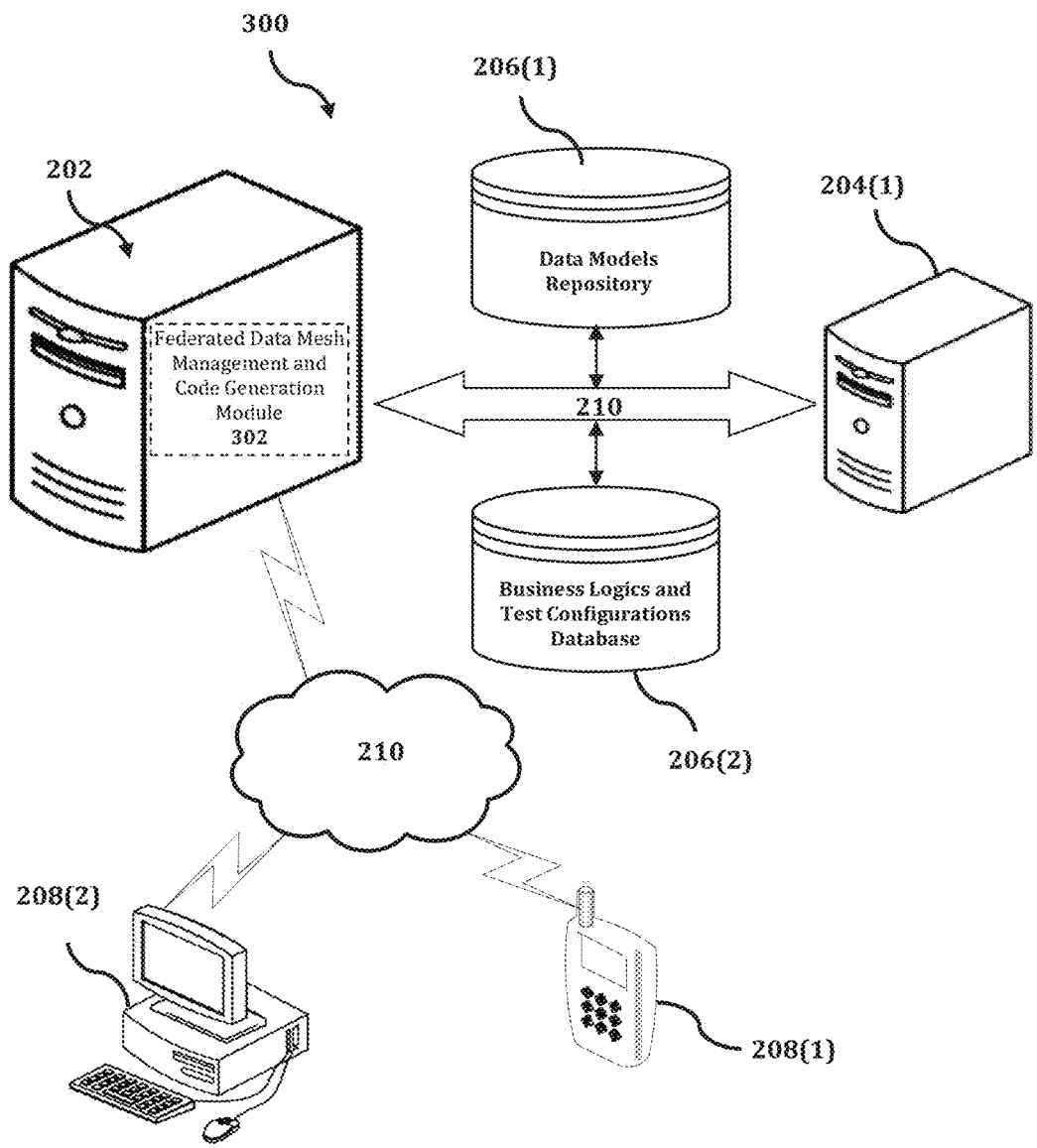
FIG. 3 shows an exemplary system for implementing a method for providing a federated, multi-product data mesh via automated source code generation based on governed and defined data models.

The FDMMCG device 202 is described and shown in FIG. 3 as including a federated data mesh management and code generation module 302, although it may include other rules, policies, modules, databases, or applications, for example. As will be described below, the federated data mesh management and code generation module 302 is configured to implement a method for providing a federated, multi-product data mesh via automated source code generation based on governed and defined data models.

An exemplary process 300 for implementing a mechanism for providing a federated, multi-product data mesh via automated source code generation based on governed and defined data models by utilizing the network environment of FIG. 2 is shown as being executed in FIG. 3. Specifically, a first client device 208(1) and a second client device 208(2) are illustrated as being in communication with FDMMCG device 202. In this regard, the first client device 208(1) and the second client device 208(2) may be "clients" of the FDMMCG device 202 and are described herein as such. Nevertheless, it is to be known and understood that the first client device 208(1) and/or the second client device 208(2) need not necessarily be "clients" of the FDMMCG device 202, or any entity described in association therewith herein. Any additional or alternative relationship may exist between either or both of the first client device 208(1) and the second client device 208(2) and the FDMMCG device 202, or no relationship may exist.

Further, FDMMCG device 202 is illustrated as being able to access a data models repository 206(1) and a business logics and test configurations database 206(2). The federated data mesh management and code generation module 302 may be configured to access these databases for implementing a method for providing a federated, multi-product data mesh via automated source code generation based on governed and defined data models.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the FDMMCG device 202 via broadband or cellular communication. Of course, these embodiments are merely exemplary and are not limiting or exhaustive.

Upon being started, the federated data mesh management and code generation module 302 executes a process for providing a federated, multi-product data mesh via automated source code generation based on governed and defined data models. An exemplary process for providing a federated, multi-product data mesh via automated source code generation based on governed and defined data models is generally indicated at flowchart 400 in FIG. 4.

Figure 4:
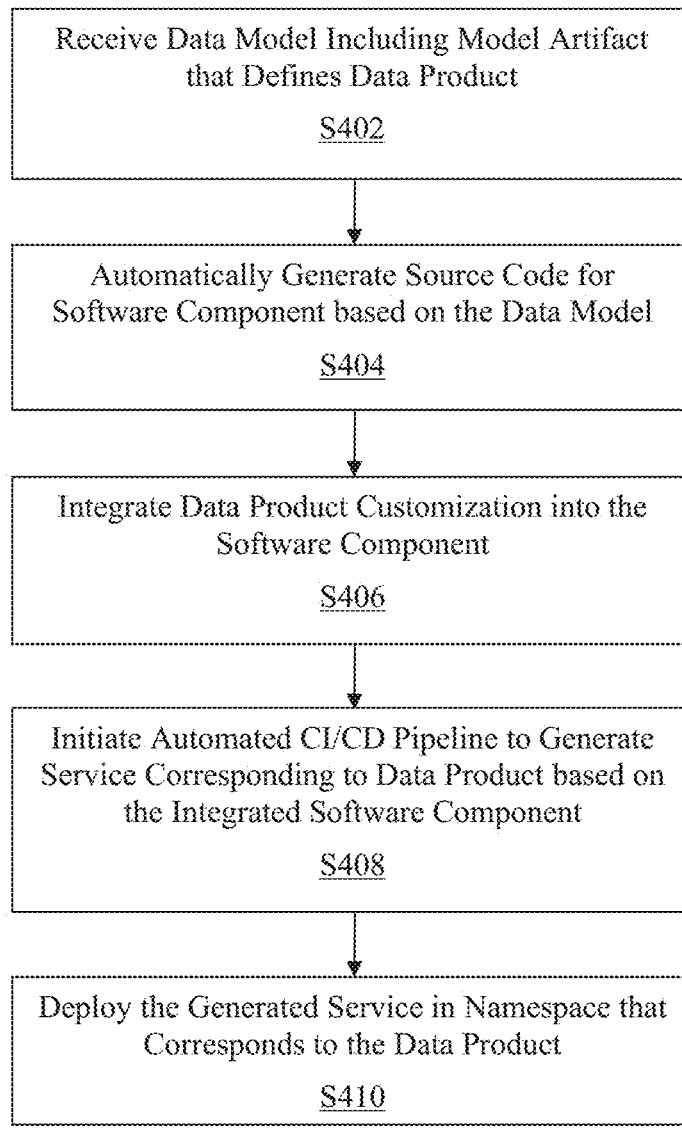
FIG. 4 is a flowchart of an exemplary process for implementing a method for providing a federated, multi-product data mesh via automated source code generation based on governed and defined data models.

In the process 400 of FIG. 4, at step S402, a data model may be received via an application programming interface (API). The data model may include a model artifact that defines data governance for a data product. In an exemplary embodiment, the data model may be received via the API from a software development platform that facilitates the generation of the data model. For example, the model may be received from an information architecture development platform that facilitates generation of data models by an information architect.

In another exemplary embodiment, the data model may be developed by using software applications such as, for example, data modelling tools that facilitate the creation of database structures from diagrams. The data modeling tools may generate data models that provide a framework for data to be used within information systems by providing specific definitions and formats. In another exemplary embodiment, the data model may correspond to visual representations of an enterprise's data elements and the connections between them. The data model may define and structure data in the context of relevant processes such as, for example, business processes to specify how data may be stored, accessed, shared, updated, and leveraged across an enterprise system.

In another exemplary embodiment, the API may correspond to a set of definitions and protocols for building and integrating application software. The API may facilitate connections between computing components as well as facilitate connections between computing programs. In another exemplary embodiment, the API may relate to a set of defined rules that explain how computing components and applications communicate with one another. For example, the API may sit between an application and a corresponding webserver to act as an intermediary layer that processes data transfers between the systems.

In another exemplary embodiment, the model artifact may relate to a byproduct of data model development that helps describe the architecture, design, and function of the data model. The model artifacts may be useable as a roadmap that facilitates the tracing of the data model development process. In another exemplary embodiment, the model artifact may include any element of a data model development project. For example, the model artifact may include documentations, test plans, data files, and executable modules.

In another exemplary embodiment, the data product may correspond to the consideration of data as a product in a data mesh paradigm. The data product may result from application of product thinking into datasets to ensure that the datasets include capabilities such as, for example, discovery, security, understandability, and trustworthiness. In another exemplary embodiment, the data product may include code, data, metadata, and necessary infrastructure to run the data product. For example, to facilitate discovery capabilities, the data product may include a search engine that allow users to register datasets and request access to the data sets.

In another exemplary embodiment, the data governance may be defined for the data product according to a centrally governed data contract. The centrally governed data contract may enable trusted publishing of data for the data product. For example, enterprise software products may define and centrally govern the data contracts such that data of the enterprise software products may be published for the consumer according to the data contract in a way that could be trusted. In another exemplary embodiment, the trustworthiness of the data may be enforced by associating globally unique immutable identifiers such as, for example, resource name identifiers to each of the product resource type instances. The resource name identifiers may include at least one from among alphabetical characters and numerical characters as well as any combinations thereof.

In another exemplary embodiment, the received data model may be validated by identifying a predetermined guideline for data governance validation that relates to the data model. The predetermined guideline may include at least one from among an operation guideline, a business guideline, and a regulatory guideline. For example, the regulatory guideline may dictate the persistence and accessibility of customer information. Then, the data model may be validated based on the predetermined guideline.

At step S404, source code for software components may be automatically generated based on the data model. The software components may correspond to a data mesh component for the data product. In an exemplary embodiment, the data mesh component may correspond to a required component to build and execute a data mesh. The data mesh component may include at least one from among a naming service component, a data source component, a data infrastructure component, and a domain-oriented data pipeline component that is managed by functional owners. In another exemplary embodiment, the automatically generated software components may include a standardized mechanism to query resource metadata information across a plurality of data products.

In another exemplary embodiment, the naming service component may enable gathering of resource information that corresponds to the data product. The gathered resource information may enable consumption-based billing for a corresponding resource. In another exemplary embodiment, the resource information may include at least one from among resource type information, resource deployment information, resource configuration information, and resource consumption information.

In another exemplary embodiment, consistent with disclosures in the present application, the naming service component may include a set of solutions that provide cloud users a coherent and integrated experience that is driven by data and mastered by loosely coupled products. The naming service component may be integrated through domain-driven design, common reference data, consistent metadata, and formal interface contracts.

In another exemplary embodiment, the naming service may offer an ecosystem of loosely coupled and distributed capabilities as well as processes that will provide a self-service management plane for simple, well governed, and automated onboarding of resource provider information such as, for example, domain name system (DNS) information and cloud directory information. The naming service system may include required tooling visualization, resource model repository, naming library generation capability, and out of the box key data integrations as well as plumbing such as, for example, a data catalog for data products to easily implement a standard naming service.

In another exemplary embodiment, the naming service system may include a federated naming service that all cloud data products may implement by leveraging capabilities offered by a cloud naming system. The federated naming service may offer process for users to obtain information such as, for example, what the resource is, where the resource is deployed, how the resource is configured, what resources are consumed, and what other resources are deployed in the same data center. In another exemplary embodiment, the naming service system may include a naming authority that is established for providing necessary oversight to overall cloud data management from a process perspective.

In another exemplary embodiment, the naming service system may include features such as standardize mechanisms to query resource metadata information across all cloud data products; a self-service API driven resource provider to facilitate data model onboarding; standardized and self-service data governance validations for all cloud data products; standardized data driven integration with other cloud capability visualizations, service fabrics, observabilities, billings, and identity; enable consumption based billing for resources; and ability for end users to tag and/or label data models for enriching resource information to support automation goals.

In another exemplary embodiment, the data mesh may correspond to a distributed architecture for modern analytical data management. The data mesh may enable end users to easily access and query data wherever the data is persisted without first transporting the data to a data lake and/or a data warehouse. In another exemplary embodiment, the data mesh may relate to a type of data platform architecture that embraces the ubiquity of data in the enterprise by leveraging a domain-oriented, federated, and self-serve design. The disclosed invention, consistent with disclosures in the present application, may provide an ecosystem of distributed software components that will help a large enterprise to quickly as well as easily build and run a well governed data mesh ecosystem.

In another exemplary embodiment, the disclosed invention may provide for a distributed software system that builds, deploy, and run a federated, multi-product data mesh via an automated code generation process. The distributed software system may enable users to define and govern the data model for data products and then auto-generate the software components required to build and run a data mesh based on the data model. The distributed software system may also provide a standardized mechanism to query product data information across all data product domains.

In another exemplary embodiment, advantages relating to implementation of the data mesh according to the disclosed invention may include enabling enterprise software products to define and centrally govern corresponding data contracts; providing an ability to auto-generate and run the federated components of the data mesh as a manages service; providing an ability to publish data of enterprise products for the consumers in a way that may be trusted and follows a strict data contract; providing an easy mechanism for discovery and consumption of cross product data domains; and providing ability for new product data to be onboarded incrementally.

At step S406, data product customizations may be integrated into the software components. The data product customizations may include at least one from among a business logic and a testing configuration. In an exemplary embodiment, prior to integrating the data product customizations, the automatically generated software components may be exposed to developers. The automatically generated software components may be exposed to developers via a development platform. Then, the data product customizations may be received from the developers via the development platform.

In another exemplary embodiment, the data product customizations may enable a developer to customize the software components based on requirements and needs. Consistent with disclosures in the present application, the developers may access the software components for a data product to efficiently implement a data mesh for the data product. As will be appreciated by a person of ordinary skill in the art, the customizing of software components that were automatically generated based on defined data model may facilitate federated governance of the resulting data mesh according to the defined data model.

At step S408, an automated continuous integration and continuous delivery (CI/CD) pipeline may be initiated to generate a service that corresponds to the data product. The CI/CD pipeline may generate the service based on the integrated software components. In an exemplary embodiment, the CI/CD pipeline may correspond to processes to be performed to facilitate development of computing software. The CI/CD pipeline may introduce monitoring and automation to improve the application development process. For example, application development may be automated and monitored at the integration and testing phases as well as during delivery and deployment.

In another exemplary embodiment, generating the service via the automated CI/CD pipeline may include a first stage to build the service based on the integrated software components. The integrated software components may include the source code for the software components and the corresponding data product customizations. The CI/CD pipeline may also include a second stage to validate the built service by using a plurality of predetermined tests. The predetermined tests may validate that the service is operating accordingly. Additionally, the CI/CD pipeline may include a third state to containerize the built service based on a result of the validation. For example, the service may be containerized in preparation for deployment when the validation is successful. Alternatively, when the validation is unsuccessful, responsible parties corresponding to the service may be automatically notified via a notification and an alert.

At step S410, the generated service may be deployed in a namespace that corresponds to the data product. In an exemplary embodiment, the namespace may include a naming service that is used to identify and refer objects of various kinds. Consistent with disclosures in the present application, the naming service may ensure that all of a given set of objects have unique names that are standardized so that the objects may be easily identified. In another exemplary embodiment, managed services may be deployed in a namespace that is separate from self-deployed services. For example, self-deployed services may be deployed in a product namespace while managed services are deployed in a customized namespace.

Figure 5:
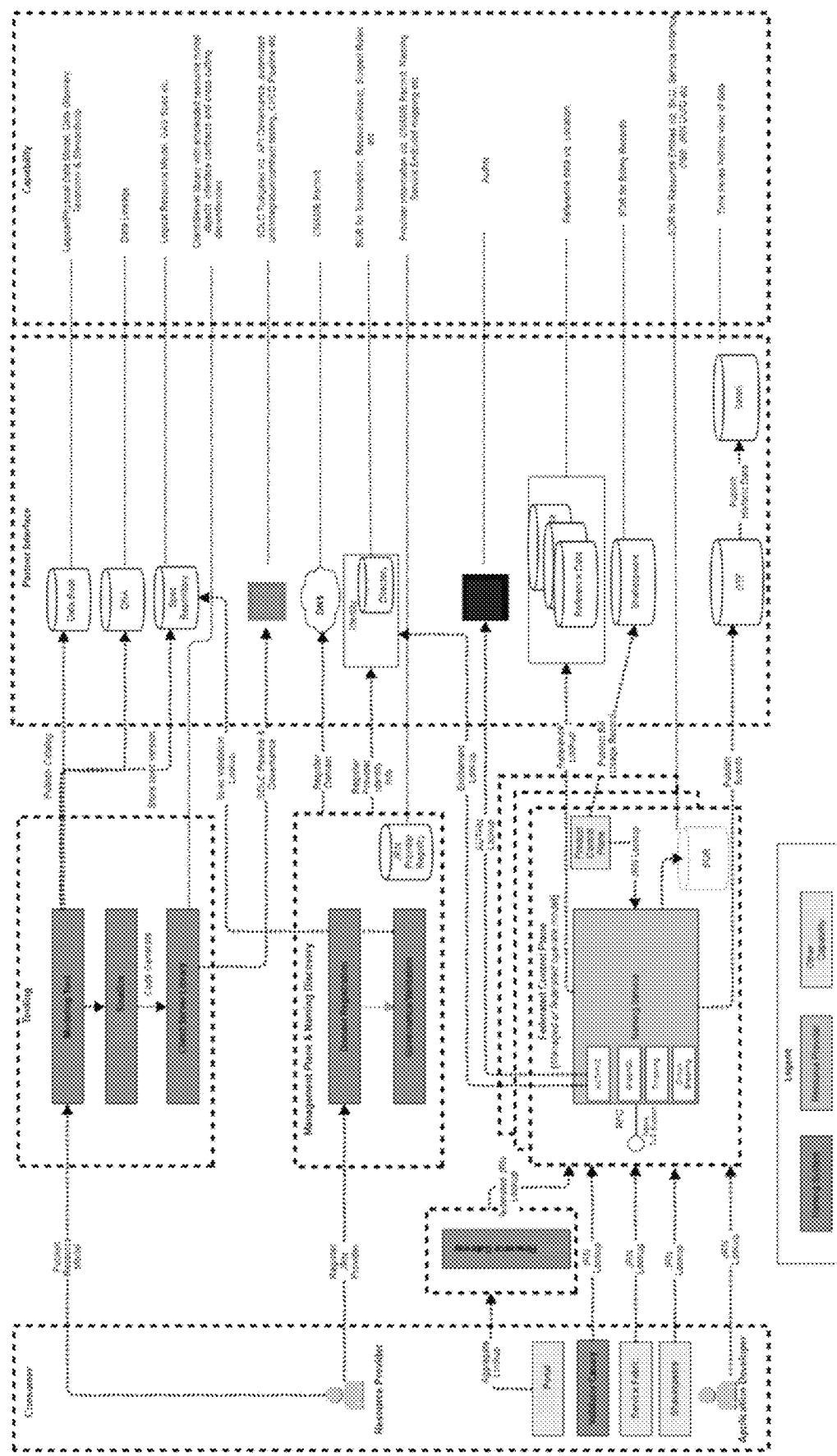
FIG. 5 is an architecture diagram of an exemplary process for implementing a method for providing a federated, multi-product data mesh via automated source code generation based on governed and defined data models.

FIG. 5 is an architecture diagram 500 of an exemplary process for implementing a method for providing a federated, multi-product data mesh via automated source code generation based on governed and defined data models.

As illustrated in FIG. 5, the naming service system may offer an ecosystem of loosely coupled distributed capabilities and processes consistent with disclosures in the present application. The naming service system may provide a self-service management plane for simple, well governed, and automated onboarding of resource provider information such as, for example, DNS information and cloud directory information. The naming service system may also provide required tooling visualizations, resource model repository, naming library generation capabilities, and out of the box key data integrations and/or plumbing such as, for example, a data catalog for products to easily implement a standard naming service.

Additionally, the naming service system may provide a federated naming service that all cloud data products can implement by leveraging capabilities offered by a cloud naming system. The federated naming service may offer a means for users to obtain information such as, for example, what the resource is, where is the resource deployed, how is the resource configured, what resources are consumed, and what other resources are deployed in the data center. Similarly, the naming service system may provide a cloud naming authority that is established for providing necessary oversight to overall cloud data management from a process perspective.

Figure 6:
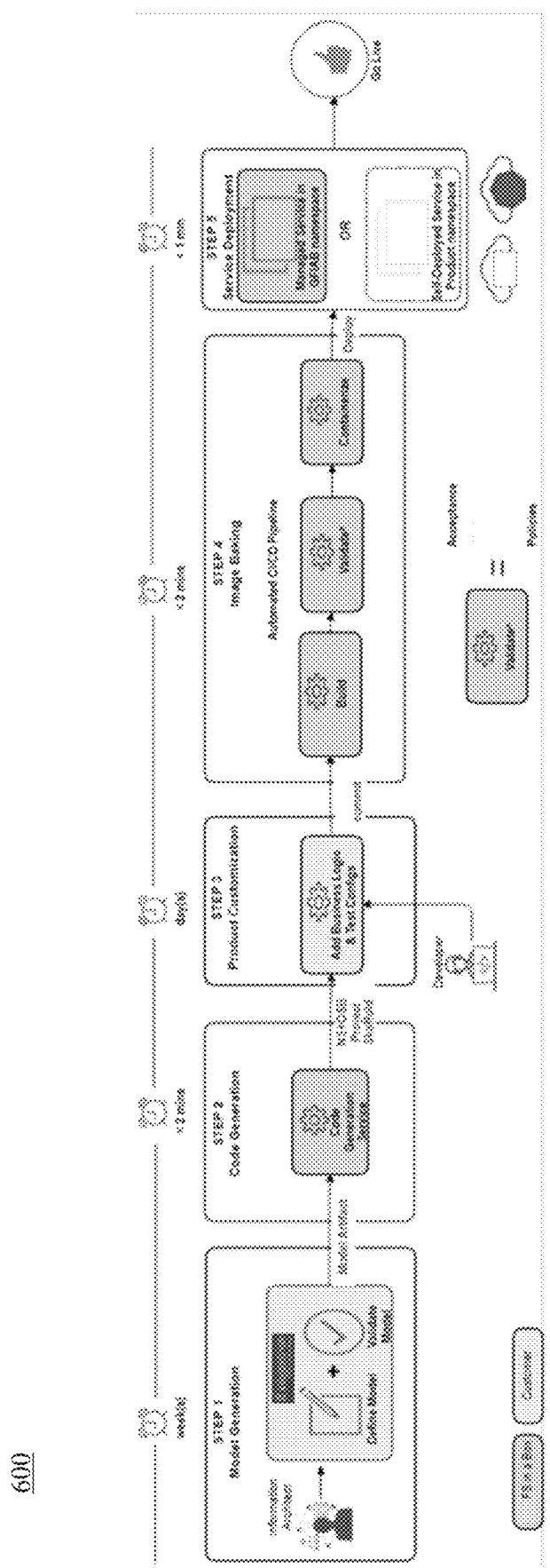
FIG. 6 is a flow diagram of an exemplary process for implementing a method for providing a federated, multi-product data mesh via automated source code generation based on governed and defined data models.

FIG. 6 is a flow diagram 600 of an exemplary process for implementing a method for providing a federated, multi-product data mesh via automated source code generation based on governed and defined data models. In FIG. 6, an automated code generator pipeline is disclosed. The automated code generator pipeline may take data models as input and generates code for naming service components.

As illustrated in FIG. 6, step 1 corresponds to model generation by an information architect. The information architect may define the data model, which will be validated consistent with disclosures in the present application. At step 2, the model artifact corresponding to the validated data model may be inputted into a code generation service for generation of various service components such as, for example, a naming service component. At step 3, developers may interact with the generated service components to customize based on specific needs. The developers may add business logic and test configurations.

At step 4, an automated CI/CD pipeline may be usable to bake an image of the service components. Baking the image of the service components may refer to creating an immutable image instance of the service components from corresponding source code with current production configurations. The CI/CD pipeline may include a build stage, a validate stage, and a containerize stage. At step 5, the output of the CI/CD pipeline may be deployed. Managed services may be deployed in a customized namespace while self-deployed services may be deployed in a product name space. Deployment of the service components enable consumption by users of the disclosed system.

Accordingly, with this technology, an optimized process for providing a federated, multi-product data mesh via automated source code generation based on governed and defined data models is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing a federated, multi-product data mesh via automated code generation, the method being implemented by at least one processor, the method comprising:
    receiving, by the at least one processor via an application programming interface, at least one data model, the at least one data model including at least one model artifact that defines data governance for at least one data product;
    automatically generating, by the at least one processor, source code for at least one software component based on the at least one data model, the at least one software component corresponding to a data mesh component for the at least one data product;
    integrating, by the at least one processor, at least one data product customization into the at least one software component, the at least one data product customization including at least one from among a business logic and a testing configuration;
    initiating, by the at least one processor, an automated continuous integration and continuous delivery (CI/CD) pipeline to generate a service that corresponds to the at least one data product based on the integrated at least one software component; and
    deploying, by the at least one processor, the generated service in a namespace that corresponds to the at least one data product.

2. The method of claim 1, further comprising:
    identifying, by the at least one processor, at least one predetermined guideline for data governance validation that relates to the at least one data model; and
    validating, by the at least one processor, the at least one data model based on the at least one predetermined guideline.

3. The method of claim 1, wherein the data mesh component corresponds to a required component to build and execute at least one data mesh, the data mesh component including at least one from among a naming service component, a data source component, a data infrastructure component, and a domain-oriented data pipeline component that is managed by functional owners.

4. The method of claim 3, wherein the naming service component enables gathering of resource information that corresponds to the at least one data product, the gathered resource information enabling consumption-based billing for a corresponding resource.

5. The method of claim 4, wherein the resource information includes at least one from among resource type information, resource deployment information, resource configuration information, and resource consumption information.

6. The method of claim 1, wherein prior to integrating the at least one data product customization, the method further comprises:
exposing, by the at least one processor via a development platform, the automatically generated at least one software component to at least one developer; and
receiving, by the at least one processor via the development platform, the at least one data product customization from the at least one developer.

7. The method of claim 1, wherein generating the service via the automated continuous integration and continuous delivery (CI/CD) pipeline further comprises:
building, by the at least one processor via the automated CI/CD pipeline, the service based on the integrated at least one software component, the integrated at least one software component including the source code for the at least one software component and the at least one data product customization;
validating, by the at least one processor via the automated CI/CD pipeline, the built service by using at least one test; and
containerizing, by the at least one processor via the automated CI/CD pipeline, the built service based on a result of the validation.

8. The method of claim 1, wherein the data governance is defined for the at least one data product according to a centrally governed data contract, the centrally governed data contract enabling trusted publishing of data for the at least one data product.

9. The method of claim 1, wherein the automatically generated at least one software component includes a standardized mechanism to query resource metadata information across a plurality of data products.

10. A computing device configured to implement an execution of a method for providing a federated, multi-product data mesh via automated code generation, the computing device comprising:
a processor;
a memory; and
a communication interface coupled to each of the processor and the memory, wherein the processor is configured to:
receive, via an application programming interface, at least one data model, the at least one data model including at least one model artifact that defines data governance for at least one data product;
automatically generate source code for at least one software component based on the at least one data model, the at least one software component corresponding to a data mesh component for the at least one data product;
integrate at least one data product customization into the at least one software component, the at least one data product customization including at least one from among a business logic and a testing configuration;
initiate an automated continuous integration and continuous delivery (CI/CD) pipeline to generate a service that corresponds to the at least one data product based on the integrated at least one software component; and
deploy the generated service in a namespace that corresponds to the at least one data product.

11. The computing device of claim 10, wherein the processor is further configured to:
identify at least one predetermined guideline for data governance validation that relates to the at least one data model; and
validate the at least one data model based on the at least one predetermined guideline.

12. The computing device of claim 10, wherein the data mesh component corresponds to a required component to build and execute at least one data mesh, the data mesh component including at least one from among a naming service component, a data source component, a data infrastructure component, and a domain-oriented data pipeline component that is managed by functional owners.

13. The computing device of claim 12, wherein the naming service component enables gathering of resource information that corresponds to the at least one data product, the gathered resource information enabling consumption-based billing for a corresponding resource.

14. The computing device of claim 13, wherein the resource information includes at least one from among resource type information, resource deployment information, resource configuration information, and resource consumption information.

15. The computing device of claim 10, wherein, prior to integrating the at least one data product customization, the processor is further configured to:
expose, via a development platform, the automatically generated at least one software component to at least one developer; and
receive, via the development platform, the at least one data product customization from the at least one developer.

16. The computing device of claim 10, wherein, to generate the service via the automated continuous integration and continuous delivery (CI/CD) pipeline, the processor is further configured to:
build, via the automated CI/CD pipeline, the service based on the integrated at least one software component, the integrated at least one software component including the source code for the at least one software component and the at least one data product customization;
validate, via the automated CI/CD pipeline, the built service by using at least one test; and
containerize, via the automated CI/CD pipeline, the built service based on a result of the validation.

17. The computing device of claim 10, wherein the processor is further configured to define the data governance for the at least one data product according to a centrally governed data contract, the centrally governed data contract enabling trusted publishing of data for the at least one data product.

18. The computing device of claim 10, wherein the automatically generated at least one software component includes a standardized mechanism to query resource metadata information across a plurality of data products.

19. A non-transitory computer readable storage medium storing instructions for providing a federated, multi-product data mesh via automated code generation, the storage medium comprising executable code which, when executed by a processor, causes the processor to:
receive, via an application programming interface, at least one data model, the at least one data model including at least one model artifact that defines data governance for at least one data product;
automatically generate source code for at least one software component based on the at least one data model, the at least one software component corresponding to a data mesh component for the at least one data product;

integrate at least one data product customization into the at least one software component, the at least one data product customization including at least one from among a business logic and a testing configuration;

initiate an automated continuous integration and continuous delivery (CI/CD) pipeline to generate a service that corresponds to the at least one data product based on the integrated at least one software component; and deploy the generated service in a namespace that corresponds to the at least one data product.

20. The storage medium of claim 19, wherein the data mesh component corresponds to a required component to build and execute at least one data mesh, the data mesh component including at least one from among a naming service component, a data source component, a data infrastructure component, and a domain-oriented data pipeline component that is managed by functional owners.

* * * * *